United States Patent [19]
Petry et al.
[11] 4,032,385
[45] June 28, 1977

[54] METHOD OF MAKING AN ADDRESS MASTER CARD SET

[75] Inventors: Eduard C. Petry, Hopkins; John R. Stielow, Minneapolis, both of Minn.

[73] Assignee: Speedaddress, Inc., Minneapolis, Minn.

[22] Filed: Apr. 26, 1976

[21] Appl. No.: 680,035

[52] U.S. Cl. ................................ 156/252; 156/259; 156/271
[51] Int. Cl.² ................................ B32B 31/00
[58] Field of Search ........... 156/252, 259, 269, 271

[56] References Cited

UNITED STATES PATENTS

| | | | |
|---|---|---|---|
| 3,003,906 | 10/1961 | Fasold et al. | 156/269 |
| 3,919,032 | 11/1975 | Greenbarg | 156/252 |
| 3,956,049 | 5/1976 | Johnsen | 156/252 |
| 3,958,051 | 5/1976 | Smith | 156/252 |

*Primary Examiner*—Douglas J. Drummond
*Attorney, Agent, or Firm*—Schroeder, Siegfried, Ryan & Vidas

[57] ABSTRACT

An address master card set wherein a modified hectographic carbon paper strip is attached to the address card with readily removable drafting tape.

3 Claims, 6 Drawing Figures

METHOD OF MAKING AN ADDRESS MASTER CARD SET

The present invention relates to address master card sets for use in hectographic addressing machines and its main object is to provide a readily removable hectographic carbon paper strip which is attached to the address card when the address is placed thereon and is to be removed from the address card thereafter.

In the present invention the carbon paper sheet is taped to the address card in a manner permitting the easy removal of the carbon paper sheet without damage to the card. Prior art address master sets which are formed by interleaving carbon paper sheets and address cards and subsequently applying adhesive to the end of an interleaved stack of cards and carbon paper sheets have proven to be unacceptable on occasion because of adhesive residues which may remain on the surface of the address card after the carbon paper is removed. Examples of prior art glued carbon paper master sets are shown in U.S. Pat. No. 3,526,262 to Hajime Yoshida.

It is an object of this invention to provide an improved master card set wherein the carbon paper sheet can be readily removed from the address card without damage to the address card and without leaving an undesirable deposit.

It is also an object of this invention to provide an address master card set which can be readily manufactured with a minimum of imperfect master card sets.

These and other objects of the invention will more fully appear from the following description, made in connection with the accompanying drawings, wherein like reference characters refer to the same or similar part throughout the several views and in which.

Figure 1:
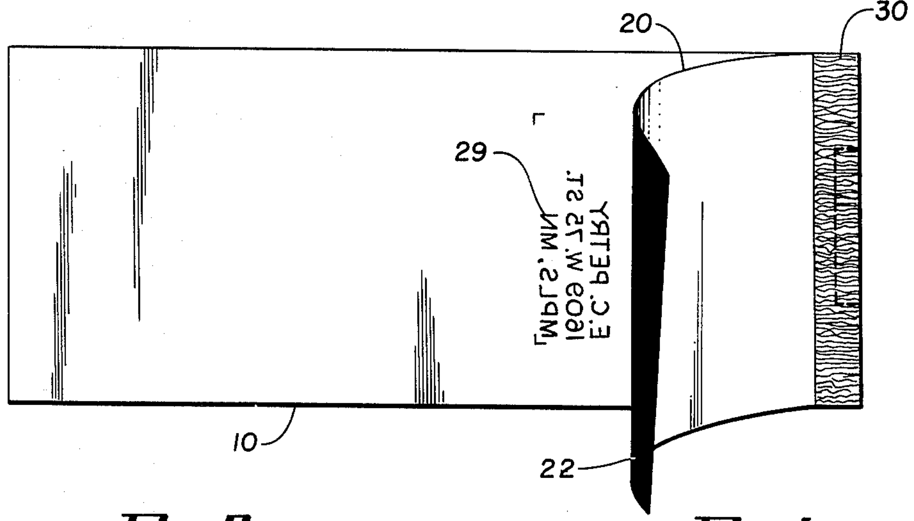
FIG. 1 shows a first embodiment of the master card set.

The drawings show two embodiments of an address master card set utilizing the teachings of the present invention. FIG. 1 shows a first embodiment of the master card set employing a master card 10 which may be any form of cardboard or heavy paper stock. The embodiment shown utilizes a standard data processing card having a nominal length of 7½ inches, a width of 3¼ inches and a thickness of approximately 0.007 inches. The address master card may be utilized in existing hectographic addressing machines.

Figure 3:
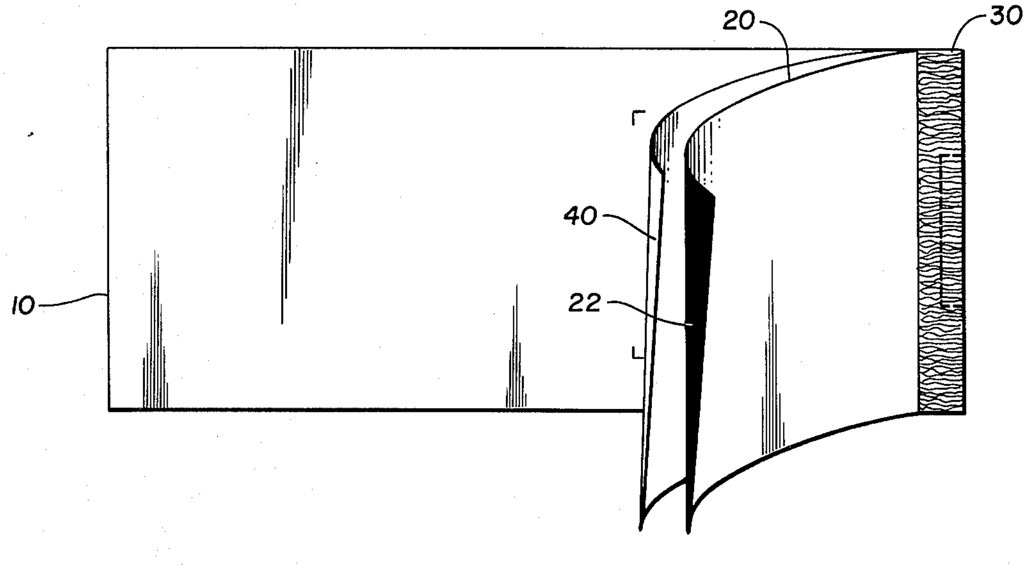
FIG. 3 is a view of an alternate embodiment of the master card set.

A hectographic carbon paper coated sheet 20 shown in FIG. 3 is attached to the address card 10 to form a master card set. The sheet 20 is coated over at least a portion of its area with a hectographic carbon coating 22. A notch 24 is cut into the upper edge 26 of sheet 22.

The address master card set is formed by aligning the upper edge 26 of sheet 20 with an edge of address card 10 and applying a strip of adhesive tape 30 to the sheet 20 and address card 10. Since edge 26 of sheet 20 is aligned with the edge of card 10, the tape 30 will contact the surface of card 10 only in the area of notch 24.

The adhesive tape 30 should be a tape having optimum "tackiness". The tape must be tacky enough to hold immediately and not so tacky as to bond tightly upon age. A "lo-tack" drafting tape manufactured by 3M Company, St. Paul, Minn., identified as "3M Tape No. 230" has been found to have the correct tackiness characteristics on both a short term and long term basis.

Figure 2:
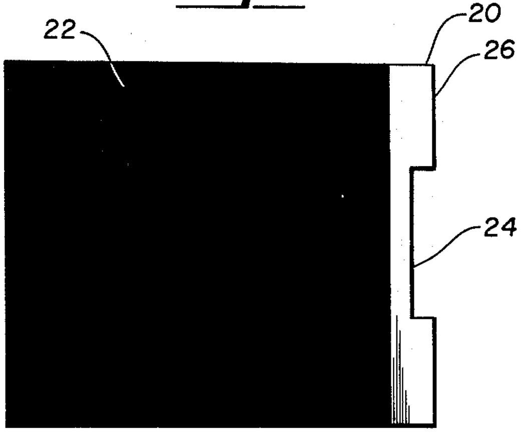
FIG. 2 is a top view of a carbon paper sheet used to manufacture the master card set.

The address master card set shown in FIGS. 1 and 2 can be utilized by applying pressure to the back of address card 10 to force a portion of the face of the card against the hectographic carbon coating 22 of sheet 20 to apply a reverse hectographic image 29 to a desired area of address card 10. The image can be applied by use of a typewriter or by use of a pencil or pen. After the image 29 has been placed on the address card, there is no further need for sheet 20 and it can be removed by grasping it firmly and pulling it away from the surface of the address card. Because of the low tackiness of the tape holding sheet 20 in place, and because of the limited area of notch 24 which limits the area bonding between tape 30 and card 10, sheet 20 can be readily removed without damage to the card surface and without leaving any adhesive residue on the surface or end of card 10 as was common with prior art master address card sets.

The undesired transfer of the carbon coating 22 from sheet 20 is minimized by placing a thin coating known as "Plastisol" over the hectographic carbon coating. The plastic coating prevents inadvertent transfer of the carbon coating to the card but allows a transfer of the carbon image when sufficient pressure is applied. Such Plastisol coated hectographic carbon paper is trademarked and is available from Columbia Ribbon and Carbon Mfg., Inc., Glen Cove, N.Y. 11542.

Figure 4:
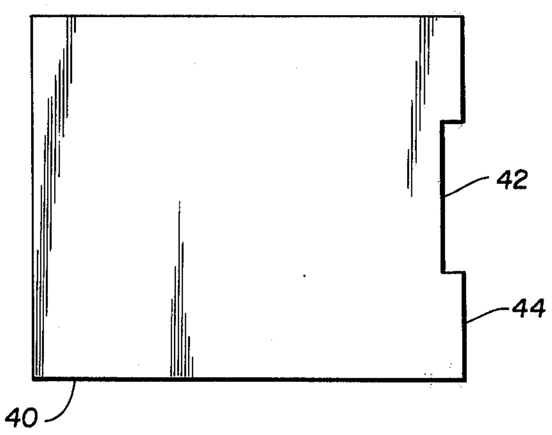
FIG. 4 is a view of a protective sheet utilized in the alternate embodiment of the master card set.

FIG. 3 shows an alternate embodiment of the address master card set which can be utilized to avoid any possibility of inadvertent transfer of material from the hectographic carbon coating 22 of sheet 20 to the card 10. In this embodiment the carbon coated sheet 20 is separated from the surface of address card 10 by an interleaved sheet 40 which is shown in plan view in FIG. 4. Sheet 40 has a notch 42 cut in the upper edge 44 which is aligned with notch 24 of the carbon coated sheet 20 and has the same dimensions. When sheets 20 and 40 are aligned with their upper edges 26 and 44 respectively, against an edge of address card 10, notches 24 and 42 are positioned so that when a strip of tape 30 is applied across the face of sheet 20 to cover notches 24 and 42, it will also contact the face of address card 10 and hold sheets 20 and 40 in place.

In the embodiments shown in FIGS. 1 and 3, the width of notch 24 is utilized with a standard data processing card shown, is approximately three-quarters of an inch across the edge 26 of the card and the depth is approximately one-quarter inch. Although satisfactory results can be obtained with other dimensions or multiples for the notch 24, it is critical in order to permit easy removal of the sheet 20 that the depth of the notch be less than the width of the tape. In cases where the depth of the notch has exceeded the width of the tape so that the entirety of the notch is not covered by the tape when it is applied to the back of sheet 20, some difficulty may be encountered in removing the sheet 20 from the address card.

The dimensions of notch 42 of sheet 40 for the card configuration shown in FIGS. 1 and 3 for easy removal of sheet 40 should be the same or slightly greater than notch 24 of sheet 20. Sheet 40 will be held in place during shipment and storage of the master card sets because it is interleaved between attached sheet 20 and card 10 and because transverse motion of edge 44 of sheet 40 along the edge of the card is restrained by the interference of notch 42 with the taped bond between sheet 20 and card 10.

Figure 5:
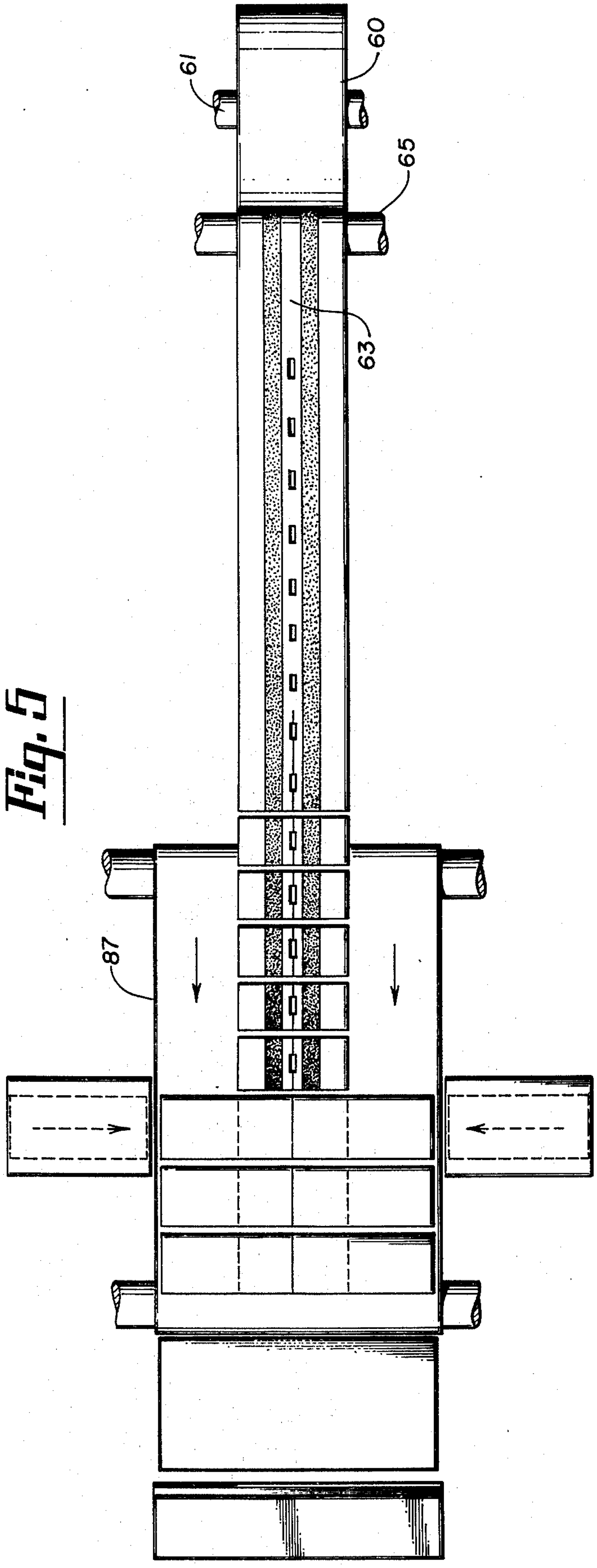
FIGS. 5 and 6 are views illustrating the method of manufacturing the master card set.
Figure 6:
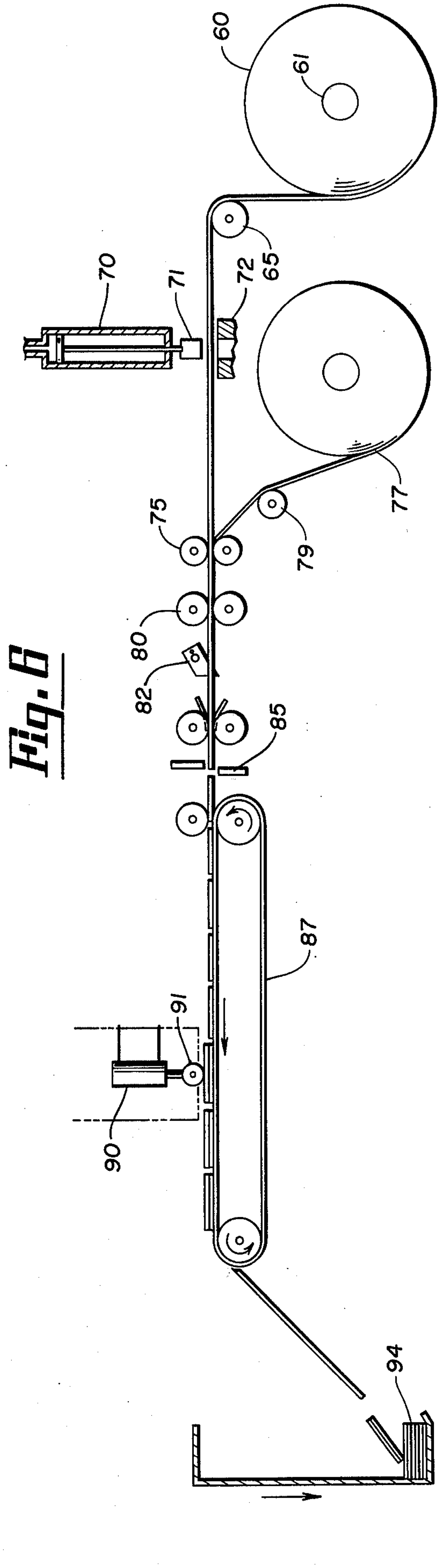

FIGS. 5 and 6 show in top and side view respectively the schematic steps in the process of forming the master card sets of the present invention. Referring now to those Figures, a carbon paper roll 60 mounted on a shaft 61 is used to store and dispense the continuous carbon paper sheet used in the present invention. The width of the carbon paper sheet 63 is equal to two times the length of the carbon paper sheet 20 which is to be attached to address master cards 10. The carbon paper strip 60 has two coated strips separated by an uncoated area. When the sheet is split along its center line two continuous sheets of carbon coated sheets 20 result.

As the carbon paper strip 63 is drawn off of roll 60, it is passed over a roller 65. The sheet is then punched by an air driven hole punch 70 which drives a cutting die 71 through sheet 63 along its center line. Die 71 may be of a generally rectangular configuration with a length along the direction of travel of the carbon strip 60 corresponding to the length of notch 24 and a width corresponding to one-half of the width of notch 24. In order to assure a proper cutting action by die 71, a die backing member 72 is used. The hole punch is actuated by conventional means not shown to punch holes in sheet 63 separated by a distance equal to the width of carbon paper sheets 20.

The punched carbon paper sheet from roll 60 is progressed from the air driven hole punch 70 through a pair of squeeze rolls 75 where the sheet and a continuous strip of adhesive tape from adhesive tape roll 77 are joined. A further guide roller 79 may be utilized to guide the strip of adhesive tape from roll 77 into squeeze rolls 75. The sticky portion of the adhesive tape is bonded to the uncoated portion of sheet 60 and completely overlies the holes punched in the sheet by die 71. Following the squeeze rolls 75, a pair of main drive rolls 80 is used to move the carbon paper strip 63 from carbon paper roll 60 past the hole punch 70 and through squeeze rolls 75. After passing through main drive rolls 80, strip 63 and the attached strips of adhesive tape are cut into two portions along their respective center lines by a slitting knife 82. After the sheet and attached adhesive tape from roll 77 have been slit into two equal width sheets by slitting knife 82, the two smaller sheets are passed through a cutter 85 which cuts the continuous sheets into individual coated carbon sheets 20. The individual sheets 20 are then moved along a conveyor belt 87 and cards from a card magazine are layed on top of each of the individual sheets 20 with the edge of the card generally aligned with the edge of the carbon paper sheet 20 in which notch 24 has been cut. As shown in FIG. 5, two separate card magazines 88, 89 located on opposite sides of the conveyor belt 87 are used to deliver cards for attachment to the carbon paper sheets 20 which have been individually cut from the two continuous carbon paper strips. In order to assure a firm bond between the exposed portion of the adhesive tape 30 and the edge of the card 10 in the vicinity of notch 24 a solenoid impact roller 90 is used to drive a roller 91 into rolling contact with the card carbon paper and adhesive tape combination in the area of notch 24. After the solenoid impact roller 90 completes the forming of the bond between the carbon paper strip and the surface of the card, the conveyor belt 87 moves the card and attached carbon sheet, known as the master card set, FIG. 1, to a collector magazine 94.

It has been found that applying a very light coating of powder at the taped end of the card to cover any portion of tape 30 which remains exposed after the master card set is manufactured will prevent address master sets from sticking to adjacent sets during storage.

Although the machine shown schematically in FIGS. 5 and 6 is intended to be used for manufacturing the embodiment of the address master card set shown in FIG. 1, it is apparent that the embodiment of the address master card set shown in FIG. 3 can be manufactured on an entirely similar machine with the only modification being that uncoated paper to form the separation sheet 40 can be dispensed from a roll in the same general location as roll 60 with both sheets passing over roller 65 to the remaining steps in the operation.

It will be apparent to those skilled in the art that various changes may be made in the details and construction of the address master card sets shown herein without departing from the inventive concept. The scope of the invention is, therefore, not limited to that which is shown in the drawings and described in the specification but only as indicated in the appended claims.

We claim:

1. A method for making address master card sets which comprise an address master card and a removably attached sheet with a hectographic carbon coating positioned adjacent to an address imprint area of said card, said method comprising the steps of:

unrolling a continuous strip of sheet material from a first roll of flexible sheet material coated on one side with two continuous bands of hectographic carbon coating, said bands being located on either side of a centerline of said strip;

punching a plurality of generally rectangular shaped holes in said strip, each of said holes being located along the centerline thereof and being spaced from adjacent holes by a distance corresponding to the width of said address master card;

applying a continuous strip of adhesive tape with its adhesive coated side adjacent to the uncoated side of said strip of sheet material along said centerline, said adhesive tape completely covering said plurality of holes;

slitting said strip of sheet material and said tape along said centerline;

cutting said strip of sheet material into individual sheets having a width corresponding to the width of said address master card;

aligning each of said individual sheets with one of said address master cards with the hectographic carbon coating positioned adjacent to said address imprint area of said card; and pressing said individual sheet and adhesive tape in the vicinity of said holes to bond said sheet to said card.

2. The method as claimed in claim 1 wherein a continuous strip of uncoated flexible sheet material is aligned with the continuous strip of sheet from said first roll and unrolled adjacent to the coated side of said continuous strip of sheet material prior to the other manufacturing steps.

3. The method as claimed in claim 1 wherein the assembled address master card sets are lightly dusted with powder in the area where said tape and said sheet are bonded to said card whereby any exposed portions of the adhesive coated tape will be prevented from bonding to adjacent address master card sets.

* * * * *